Oct. 19, 1965  T. E. BRANSCUM  3,212,135
PLASTIC EXTRUSION

Filed Oct. 16, 1961  2 Sheets-Sheet 1

INVENTOR.
T. E. BRANSCUM
BY Hudson & Young

ATTORNEYS

3,212,135
PLASTIC EXTRUSION
Tony E. Branscum, Bartlesville, Okla., assignor to Phillips Petroleum Company, a corporation of Delaware
Filed Oct. 16, 1961, Ser. No. 145,151
2 Claims. (Cl. 18—14)

This invention relates to extrusion of plastic. In one of its aspects, the invention relates to an improved method of extruding a plastic by removal of vapors from its surface subsequent to extrusion. In another aspect, the invention relates to an improved method for forming a thermoplastic pipe by venting vapors from its surface subsequent to extrusion. In another aspect, the invention relates to a method of producing a smooth surface on an extruded plastic object by preventing formation of vapor pock-marks thereon. In still another aspect, the invention relates to a smooth-surfaced plastic pipe and apparatus for producing the same by providing the extrusion apparatus with a vapor-venting shaping tube. In yet another aspect, the invention relates to extrusion apparatus and a mandrel extended beyond the die adapted to produce a smooth-surfaced article, the mandrel extension being provided with a vapor-venting manifold.

In the past, there has been prevalent the problem in the plastics fabrication industry of producing an extruded article having a smooth surface. In general, this problem has been aggrevated when extrusion rates are increased in an attempt to operate in a more economical fashion. Extruded articles have, in the past, generally had a pock-marked surface. This surface is undesirable both from the standpoint of appearance and also in some instances from the standpoint of serviceability, as, for example, in utilization of a plastic pipe wherein a smoother surface produces a lower pressure drop. It has now been discovered that the surface characteristics of an extruded plastic article can be greatly improved by removing vapors and gases from the surface of the article as it is being formed. Although it is not presently known, it is theorized that some vapors or gases are formed from moisture or volatiles present in the extrusion compound, and that these vapors come to the surface of the extrudate added as it is being formed, causing the surface pock-marks or other roughness. Accordingly, I have provided for the removal of these vapors or gases during extrusion, subsequent to the die.

It is an object of this invention to provide method and apparatus for extruding a smooth-surfaced plastic article. It is another object of this invention to provide method and apparatus for producing a smooth-surfaced plastic pipe. It is still another object of this invention to provide forming means capable of producing a smooth-surfaced plastic article. It is yet another object of this invention to produce an extruded plastic article having an improved surface.

Figure 1:
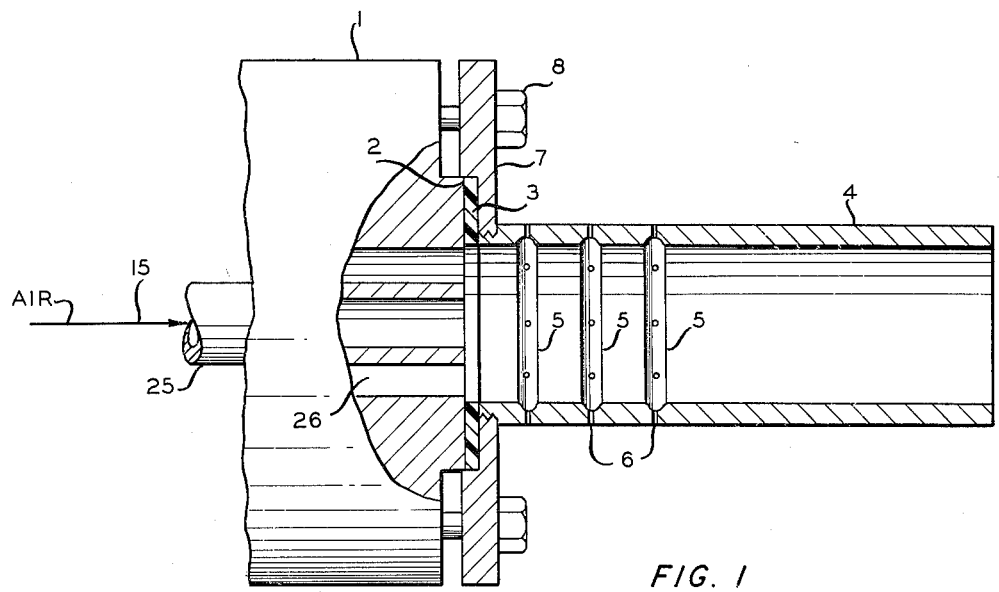
Figure 2:
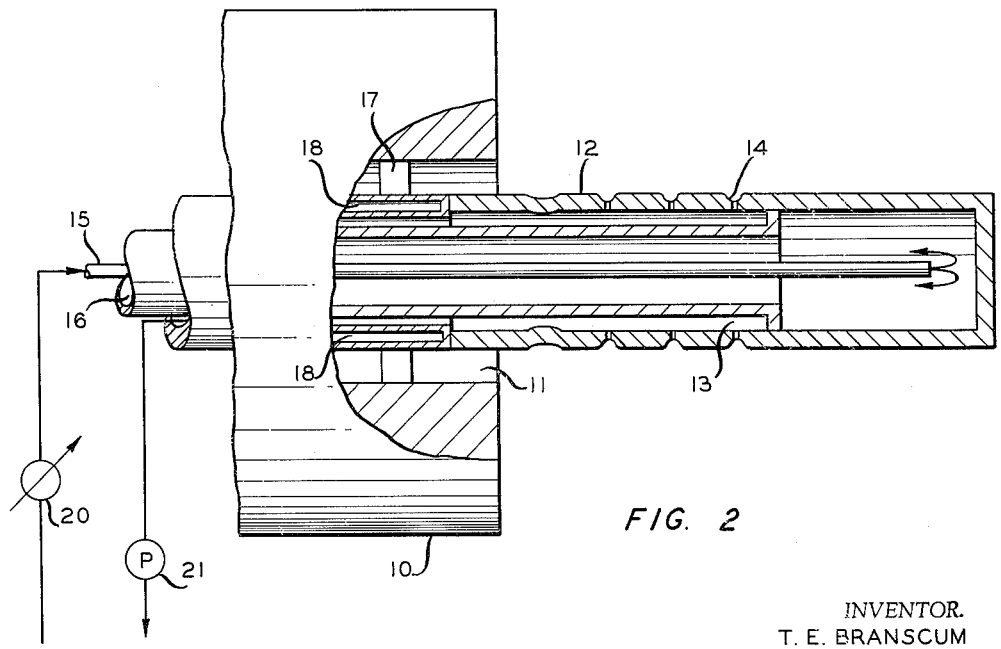

Other aspects, objects and the several advantages of the invention will become apparent upon study of this disclosure, the claims appended thereto, and the accompanying drawing in which FIGURE 1 is a view partly in elevation and partly in section of one embodiment of my invention; FIGURE 2 is a view partly in elevation and partly in section of another embodiment of my invention; and FIGURE 3 is an elevational view of apparatus used in the extrusion of thermoplastic tubing.

According to my invention, there is provided a method of extruding thermoplastic which comprises passing molten thermoplastic through a shaping zone while removing vapors from the surface of said molten thermoplastic. There is further provided extrusion apparatus comprising plastic solids feeding means, means for melting plastic adapted to receive plastic solids from said feeding means, shaping means, and means for forcing molten plastic from said means for melting through said shaping means, said shaping means comprising an elongated passageway having a cross-sectional shape perpendicular to the longitudinal axis thereof corresponding to the shape of the article to be extruded and further having means to pass vapors therefrom. There is also provided a shaping die comprising an elongated hollow cylinder having an interior annular groove, said groove being provided with a vapor vent hole.

Figure 3:
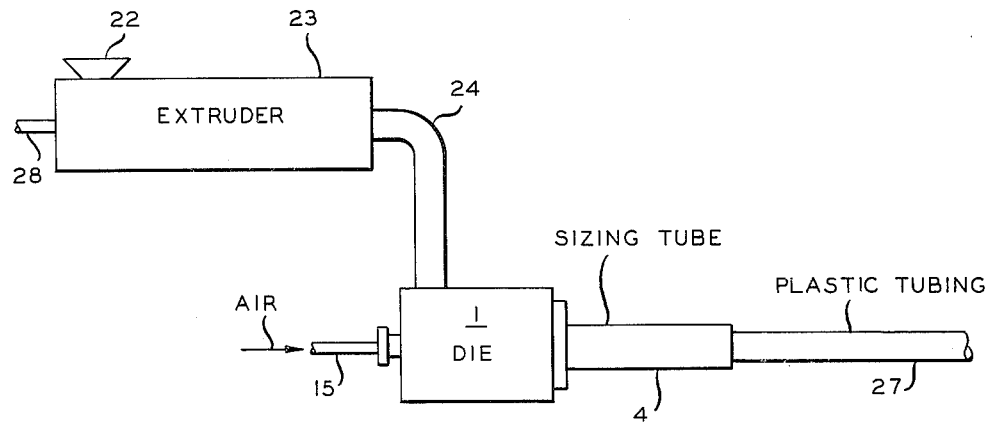

Referring now to the drawing, and to FIGURE 3 in particular, reference numeral 23 designates a conventional extruder to which particulate thermoplastic material, such as polyethylene, is supplied by feed means such as one or more hoppers 22. Extruder 23 is provided with suitable heating means (not shown) to melt the thermoplastic material which is passed to the right by the action of a screw or the like, which is rotated by means of shaft 28, connected to any suitable power source (not shown). The molten thermoplastic material passes from extruder 23 via elbow pipe 24 into a die 1 from which it is extruded, through an annular opening 26 (FIGURE 1), in the shape of a tube. It will be understood that this is conventional extrusion equipment and the particular arrangement of the parts as shown are not to have any limiting effect upon the invention hereinafter described.

Referring to FIGURE 1, die 1 terminates in a collar portion 2, and can further be provided with an insulating gasket 3. According to the invention, there is provided, for example, for the production of pipe, an elongated shaping zone or sizing tube 4. This tube is provided on its interior with one or a series of annular streamlined grooves 5. The grooves 5 have a series of small holes 6 located therein communicating through the wall of the tube 4 to its exterior. The entire sizing assembly is held to the extruder by clamping ring 7 and bolts 8. In operation, the apparatus of FIGURE 1 is adapted to produce a smooth-surfaced object. Although I do not wish to be limited thus, it is the present theory that the extrudate is blown into the grooves as it moves through the tube and is ironed out as it is pulled back in diameter. The small vent holes in the grooves allow any volatiles which may be trapped between the extrudate and the sizing tube to escape and thus eliminate small areas of insulation which can cause "sinks" or "pock-marks" on the surface of the extrudate. Although the sizing tube is shown in the drawing with no water jacket, it can be cooled by inserting the tube into a cooling bath. Alternately, cooling can be achieved with a jacketed tube. When a water jacket is used on this tube, the water outlet openings of the jacket should be somewhat larger than the inlet in order to prevent a pressure build-up inside the jacket which might force water through the small vent holes. The vent holes are small enough to prevent cooling water from running into the tube under normal water pressure.

When it is desired to produce hollow tubing a hollow mandrel 25 is suitably positioned inside of the die 1 which together with an inner surface of the die member 1 defines an axial annular die opening or outlet 26 for the molten plastic material. Compressed air 15, or other such fluid under pressure, is passed through the interior of mandrel 25 into the sizing tube 4, said compressed air aids in maintaining the dimensions of the plastic tubing as it is being cooled in the sizing tube in the manner as is well known in the art.

Referring now to FIGURE 2, there is shown an embodiment of my invention which is adapted to produce a smooth interior surface on an extruded article. An extruder terminates in a front end with a die portion 10. This die portion is provided with a longitudinal bore 11 for passage of molten polymer. Arranged within this passageway is the up stream portion of a mandrel 12 supported approximately centrally within the bore by suitable supports 17. This mandrel can be provided with an inlet passageway 15 and exit passageway 16 for passage of a temperature control medium, such as air which is passed through a heat exchanger 20, and can further be provided with a heat source, such as a cartridge heater 18 which are located in the wall of said mandrel 12. Mandrel 12 has arranged on the outside surface of its downstream end one or a series of streamlined circumferential grooves 14. These grooves are provided with a series of small passageways connecting the vent manifold 13 with the soft polymer. The circumferential grooves 14 are adapted to remove vapors from the interior surface of the extrudate as it passes over them; to this end, the vent manifold 13 can be connected at its upstream end to a vacuum pump 21.

In order to more fully describe my invention, reference is now made to the following specific examples.

EXAMPLE II

The following are typical extrusion operating conditions for production of 1-inch pipe:

Extruder temperature:
  Zone 1 (hopper section) _____ °F__ 380
  Zone 2 _____ °F__ 390
  Zone 3 _____ °F__ 400
  Zone 4 _____ °F__ 410
  Die _____ °F__ 410
  Screw speed _____ r.p.m__ 100
  Extrusion speed _____ ft./min__ 16.6
  Output (polymer) _____ lbs./hr__ 110
  Sizing air pressure [1] _____ p.s.i__ 20
  Cooling water temp.[2] _____ °F__ 50

[1] Pressure sufficient to blow the soft thermoplastic pipe material out against the sizing tube.
[2] Temperature of the water circulating around the coils in a cooling jacket to cool the pipe material in the sizing tube.

EXAMPLE III

The following table shows dimensions useful in designing the sizing tube of FIGURE 1. All of the dimensions in the said table are expressed in inches.

*Table I*

DIE AND SIZING TUBE DIMENSIONS, SCHEDULE 40 PIPE [1]

| Pipe Size | Pipe, I.D. (Nominal) | Pipe Wall (Minimum) | Pipe, O.D. (Nominal) | Sizing Tube, I.D. (1.02 x Pipe O.D.) | Die Bushing, I.D. (.90 x Pipe O.D.) | Mandrel, O.D. | Sizing Tube Length, inches | Die Land Length |
|---|---|---|---|---|---|---|---|---|
| ½ | .622 | .109 | .840 | .857 | .756 | .320 | 3 | 1.75 |
| ¾ | .824 | .113 | 1.050 | 1.071 | .962 | .510 | 4 | 1.75 |
| 1 | 1.049 | .133 | 1.315 | 1.341 | 1.182 | .685 | 4 | 2.0 |
| 1¼ | 1.380 | .140 | 1.660 | 1.693 | 1.493 | 1.000 | 5 | 2.0 |
| 1½ | 1.610 | .145 | 1.900 | 1.938 | 1.710 | 1.200 | 5 | 2.0 |
| 2 | 2.067 | .154 | 2.375 | 2.423 | 2.135 | 1.540 | 6 | 2.0 |
| 3 | 3.068 | .216 | 3.500 | 3.570 | 3.150 | 2.620 | 8 | 2.0 |
| 4 | 4.026 | .237 | 4.500 | 4.590 | 4.050 | 3.550 | 8 | 2.0 |
| 6 | 6.065 | .280 | 6.625 | 6.658 | 5.980 | 5.390 | 10 | 2.0 |

[1] Pipe schedule is graded on the internal working pressure which the pipe can withstand and is designated as:

$$\text{Schedule} = 1000 \frac{P}{S}$$

wherein S is the allowable working stress in p.s.i. of the specific working material of construction used, and P is the internal working pressure (p.s.i.). The various schedules of pipes are then calculated by multiplying $$1000 \times \frac{P}{S}$$

and any schedule can be calculated in that manner.

EXAMPLE I

A sizing tube was constructed according to the arrangement shown in FIGURE 1 using the following dimensions:

Overall length of tube 4 _____ 4 inches.
Number of grooves 5 _____ 3.
Wall thickness of tube 4 _____ ⅛ inch.
Depth of grooves 5 _____ 1/16 inch.
Distance from first groove 5 to extruder outlet _____ ⅜ inch.
Spacing between first and second grooves 5 and second and third grooves 5 _____ ½ inch.
Diameter of vent holes 6 ____ 0.020 inch.
Spacing of vent holes 6 _____ ⅛ inch apart all around.

The tube 4 was constructed of aluminum. It was found that production rate using this tube could be increased from 50 pounds per hour to 90 pounds per hour over using a conventional sizing tube and that the extrudate thus produced had a highly satisfactory exterior surface. The material extruded in this instance was an ethylene homopolymer of high density, around 0.960. Its melt index was around 0.2.

Although the invention is useful for extrusion of plastics generally and thermoplastics in particular, it has been found that the invention produces particularly effective results on extrusion of olefin homopolymers and copolymers, particularly those of high density and relatively low melt index.

Reasonable variation and modification are possible within the scope of this disclosure, drawings, and appended claims to this invention, the essence of which is that there are provided method and apparatus for removal of vapors from the surface of an extrudate.

I claim:
1. Extension apparatus for forming a thermoplastic pipe having smooth surfaces comprising plastic solids feeding means; melting means connecting with said feeding means for melting plastic solids passing therethrough; die shaping means; pressure means for forcing molten plastic from said melting means through said die shaping means, the improvement therewith of a hollow sizing tube connecting with said die shaping means, said sizing tube comprising an elongated passageway, said passageway being provided with a plurality of annular grooves extending along a portion thereof, each of said grooves having a plurality of openings extending through a wall of the sizing tube in order to permit any vapors present in the plastic solids passing therethrough to escape through the wall of said sizing tube; and pressure means for maintaining the plastic solids in intimate contact with the surface of the sizing tube.

2. Extrusion apparatus for forming a hollow pipe comprising plastic solids feeding means, melting means connected with said feeding means, for melting plastic solids passing therethrough; die shaping means; an elongated hollow inner mandrel member concentrically mounted within said die means, thereby defining a uniform annular channel between said mandrel and said die means; pressure means for forcing molten plastic from said melting means through said channel, the improvement therewith of a hollow sizing tube connecting with said die shaping means, said sizing tube comprising an elongated passageway, said passageway being provided with a plurality of annular grooves extending along a portion thereof, each of said grooves having a plurality of openings extending through a wall of the sizing tube in order to permit any vapors present in the exterior surface of the plastic solids passing therethrough to pass through the wall of said sizing tube; and pressure means for holding the plastic solids in intimate contact with the inner surface of the sizing tube.

References Cited by the Examiner

UNITED STATES PATENTS

| | | |
|---|---|---|
| 1,156,096 | 10/15 | Price. |
| 2,368,404 | 1/45 | Bent et al. |
| 2,537,977 | 1/51 | Dulmage _____ 18—12 |
| 2,579,815 | 12/51 | Gialanella _____ 18—12 |
| 2,616,128 | 11/52 | Barry et al. _____ 264—95 |
| 2,912,041 | 11/59 | Boggs _____ 18—14 |
| 2,987,765 | 6/61 | Cichelli _____ 18—14 |
| 2,987,776 | 6/61 | Miller et al. _____ 264—89 |
| 3,095,608 | 7/63 | Munsell _____ 264—169 |

ROBERT F. WHITE, *Primary Examiner.*

WILLIAM J. STEPHENSON, ALEXANDER H. BRODMERKLE, *Examiners.*

UNITED STATES PATENT OFFICE
CERTIFICATE OF CORRECTION

Patent No. 3,212,135            October 19, 1965

Tony E. Branscum

It is hereby certified that error appears in the above numbered patent requiring correction and that the said Letters Patent should read as corrected below.

Column 4, line 63, for "Extension" read -- Extrusion --.

Signed and sealed this 6th day of September 1966.

(SEAL)
Attest:

ERNEST W. SWIDER  
Attesting Officer

EDWARD J. BRENNER  
Commissioner of Patents